(12) United States Patent
Aldworth

(10) Patent No.: US 11,546,740 B2
(45) Date of Patent: Jan. 3, 2023

(54) ROUTING OF TOLL-FREE NUMBERS AND TEXT MESSAGES USING A TOLL-FREE EXCHANGE

(71) Applicant: David Aldworth, Denver, CO (US)

(72) Inventor: David Aldworth, Denver, CO (US)

(73) Assignee: Teliax Technology LLC, Aurora, CO (US)

( * ) Notice: Subject to any disclaimer, the term of this patent is extended or adjusted under 35 U.S.C. 154(b) by 75 days.

(21) Appl. No.: 17/063,239

(22) Filed: Oct. 5, 2020

(65) Prior Publication Data

US 2021/0021970 A1    Jan. 21, 2021

Related U.S. Application Data

(63) Continuation of application No. 15/864,542, filed on Jan. 8, 2018, now Pat. No. 11,140,525, which is a continuation of application No. 14/970,190, filed on Dec. 15, 2015, now Pat. No. 9,872,156, which is a continuation-in-part of application No. 14/836,396, filed on Aug. 26, 2015, now Pat. No. 9,807,249.

(51) Int. Cl.
| | |
|---|---|
| *H04W 4/00* | (2018.01) |
| *H04W 4/14* | (2009.01) |
| *H04L 51/10* | (2022.01) |
| *H04M 15/00* | (2006.01) |
| *H04W 4/24* | (2018.01) |
| *H04L 51/214* | (2022.01) |

(52) U.S. Cl.
CPC .............. *H04W 4/14* (2013.01); *H04L 51/10* (2013.01); *H04L 51/214* (2022.05); *H04M 15/09* (2013.01); *H04M 15/8061* (2013.01); *H04M 15/8221* (2013.01); *H04W 4/24* (2013.01)

(58) Field of Classification Search
CPC ........ H04M 1/003; H04M 3/00; H04M 15/09; H04M 15/66; H04M 15/772; H04M 15/773; H04M 2207/203; H04M 2207/206; H04M 2215/62; H04M 2215/7268; H04M 2215/7263; H04L 45/74; H04L 45/741; H04L 51/10; H04L 51/14; H04L 15/09; H04L 15/8061; H04L 15/8221; H04W 4/14; H04W 4/24
USPC ......................................................... 455/466
See application file for complete search history.

(56) References Cited

U.S. PATENT DOCUMENTS

| | | |
|---|---|---|
| 6,167,124 A | 12/2000 | Johnson |
| 6,222,912 B1 | 4/2001 | Breuer |
| 6,343,123 B1 | 1/2002 | Lehmacher |

(Continued)

FOREIGN PATENT DOCUMENTS

| | | |
|---|---|---|
| WO | 00/59197 | 10/2000 |
| WO | 00/65850 | 11/2000 |

*Primary Examiner* — Huy C Ho
(74) *Attorney, Agent, or Firm* — Merchant and Gould P.C.

(57) ABSTRACT

Aspects of this disclosure are directed to a method of routing text messages to subscribers of toll-free numbers using the toll-free exchange. Typically, an originating texter will draft a text message, using, for example, an SMS component of a cellular phone to a toll-free subscriber. In an aspect of the present disclosure, the text message is sent to the originating texter's service provider, which then routes the text message to the toll-free exchange. The toll-free exchange looks up the RESPORG ID associated with the ten-digit toll-free number, and the RESPORG ID is used for text message routing.

23 Claims, 7 Drawing Sheets

(56) References Cited

U.S. PATENT DOCUMENTS

| | | | |
|---|---|---|---|
| 6,574,661 B1 * | 6/2003 | Delano | G06F 11/0784 379/267 |
| 7,953,218 B2 | 5/2011 | Sanchez et al. | |
| 8,537,991 B2 | 9/2013 | McClure | |
| 8,559,614 B2 | 10/2013 | Kell et al. | |
| 8,792,478 B2 | 7/2014 | Kell et al. | |
| 9,036,625 B2 | 5/2015 | Kell et al. | |
| 9,124,957 B1 | 9/2015 | Fogel | |
| 9,392,123 B1 | 7/2016 | Yin | |
| 9,516,174 B1 | 12/2016 | Vishwanath | |
| 9,531,886 B2 | 12/2016 | Wong | |
| 9,549,066 B2 * | 1/2017 | Sharma | H04M 15/59 |
| 9,553,997 B2 | 1/2017 | Sharma | |
| 9,571,666 B2 | 2/2017 | Sharma | |
| 9,571,667 B2 | 2/2017 | Kimmel | |
| 9,546,649 B2 | 5/2017 | Sharma | |
| 9,654,648 B2 | 5/2017 | Sharma | |
| 9,654,649 B2 | 5/2017 | Sharma | |
| 9,674,372 B2 | 6/2017 | Kamas | |
| 9,716,799 B2 | 7/2017 | Sharma | |
| 9,800,742 B2 | 10/2017 | Sharma | |
| 9,807,249 B2 | 10/2017 | Aldworth | |
| 9,872,156 B2 | 1/2018 | Aldworth | |
| 2005/0058270 A1 | 3/2005 | Allen | |
| 2006/0004641 A1 | 1/2006 | Moore | |
| 2008/0119295 A1 | 5/2008 | Csik | |
| 2010/0014651 A1 | 1/2010 | Bajpay | |
| 2010/0195813 A1 * | 8/2010 | Leister | H04M 15/08 379/220.01 |
| 2016/0127562 A1 | 5/2016 | Chauhan | |
| 2017/0180567 A1 | 6/2017 | Sharma | |
| 2018/0020102 A1 | 1/2018 | Aldworth | |
| 2018/0027129 A1 | 1/2018 | Sharma | |
| 2018/0132073 A1 | 5/2018 | Aldworth | |
| 2020/0404463 A1 | 12/2020 | Aldworth | |
| 2021/0006946 A1 | 1/2021 | Aldworth | |

* cited by examiner

ROUTING OF TOLL-FREE NUMBERS AND TEXT MESSAGES USING A TOLL-FREE EXCHANGE

CROSS-REFERENCE TO RELATED APPLICATIONS

This application is a continuation application of U.S. Non-Provisional application Ser. No. 15/864,542, filed Jan. 8, 2018, entitled "ROUTING OF TOLL-FREE NUMBERS AND TEXT MESSAGES USING A TOLL-FREE EXCHANGE," which is a continuation application of U.S. Non-Provisional application Ser. No. 14/970,190 (now U.S. Pat. No. 9,872,156), filed Dec. 15, 2015, which is a continuation-in-part application of and claims priority to U.S. Non-Provisional application Ser. No. 14/836,396 now U.S. Pat. No. 9,807,249), filed Aug. 26, 2015, entitled "ROUTING OF TOLL-FREE NUMBERS USING A TOLL-FREE EXCHANGE," the disclosures of which are hereby incorporated by reference in their entirety.

INTRODUCTION

Toll-free telephone systems provide originating callers with the ability to place free telephone calls. More particularly, toll-free telephone numbers are set up such that the called party, also referred to as the subscriber of the toll-free number, pays for each call received rather than the calling/originating party. In the United States, toll-free numbers typically begin with a '1' followed by a three-digit code such as 800, 888, 877, 866, 855, or 844.

Typically, toll-free numbers are assigned by "Responsible Organizations," or "RESPORGs." RESPORGs maintain the registration and routing of individual toll-free numbers that are stored in the SMS-800 database. Accordingly, each RESPORG has access to the SMS-800 database, which is a central registry of all toll-free numbers. In particular, SMS-800 is an administrative entity responsible for assigning RESPORG IDs to RESPORGs and storing toll-free numbers and routing information related to each toll-free number. Routing information may include the individual or company that subscribes to each toll-free number and the carrier associated with handling direct routing of each toll-free call.

Typically, toll-free calls are routed from the service provider of the originating caller, wherein the service provider does a look up of the carrier identification code (CIC) associated with ultimately handling the toll-free number. A CIC is a unique code that identifies a telephone service provider. The call is thereafter connected to the identified service provider, which routes the call to the toll-free subscriber (sometimes also referred to as the terminating client). Toll-free subscribers are generally assessed a per minute fee based on a Local Exchange Carrier (LEC) tariff plus a margin for each network and service provider that carriers the call to the subscriber.

Routing of Toll-Free Numbers Using a Toll-Free Exchange

In general terms, this disclosure is directed to a method of toll-free routing using a toll-free exchange. This disclosure provides toll-free routing of calls and routing of text messages to toll-free numbers using a toll free exchange. By using a toll-free exchange instead of normal call routing, the method minimizes the number of hand-offs and reduces the ultimate cost of the toll-free call. Toll-free subscribers are generally assessed a per minute fee based on a LEC tariff plus a margin for each network and service provider that carriers the call to the subscriber In a first embodiment, aspects of the present disclosure are directed to a method for routing a text message to a toll-free number through a toll-free exchange, the method, performed by one or more computing devices operating as the toll-free exchange, comprising: receiving, from an originating responsible organization (RESPORG), a text message, wherein the text message is directed to a toll-free subscriber that is served by a terminating RESPORG; querying a database to determine a RESPORG identification associated with the terminating RESPORG; and routing, to the terminating RESPORG, the text message based in part on the RESPORG identification.

In a second embodiment, aspects of the present disclosure are directed to a method for routing text messages to a toll-free subscriber, the method comprising: receiving, from an originating responsible organization (RESPORG), a text message, wherein the text message is directed to a toll-free subscriber that is served by a terminating RESPORG; querying a database to determine a RESPORG identification associated with the terminating RESPORG; and routing, to the terminating RESPORG, the text message through a network, based in part on the RESPORG identification.

In a third embodiment, aspects of the present disclosure are directed to a system for routing a text message to a toll-free subscriber using a toll-free exchange, the system comprising: at least one session border controller for routing a data portion of the text message within the toll-free exchange; a policy router for determining, based at least on data included within the data portion, a responsible organization (RESPORG) identification (ID) associated with a terminating RESPORG; a service control point for storing the RESPORG ID of the terminating RESPORG; a database for storing enrollment information associated with the terminating RESPORG; and a media gateway server farm having one or more server computing devices for routing a media portion of the text message.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the novel aspects of the technology as claimed.

DETAILED DESCRIPTION

Figure 1:
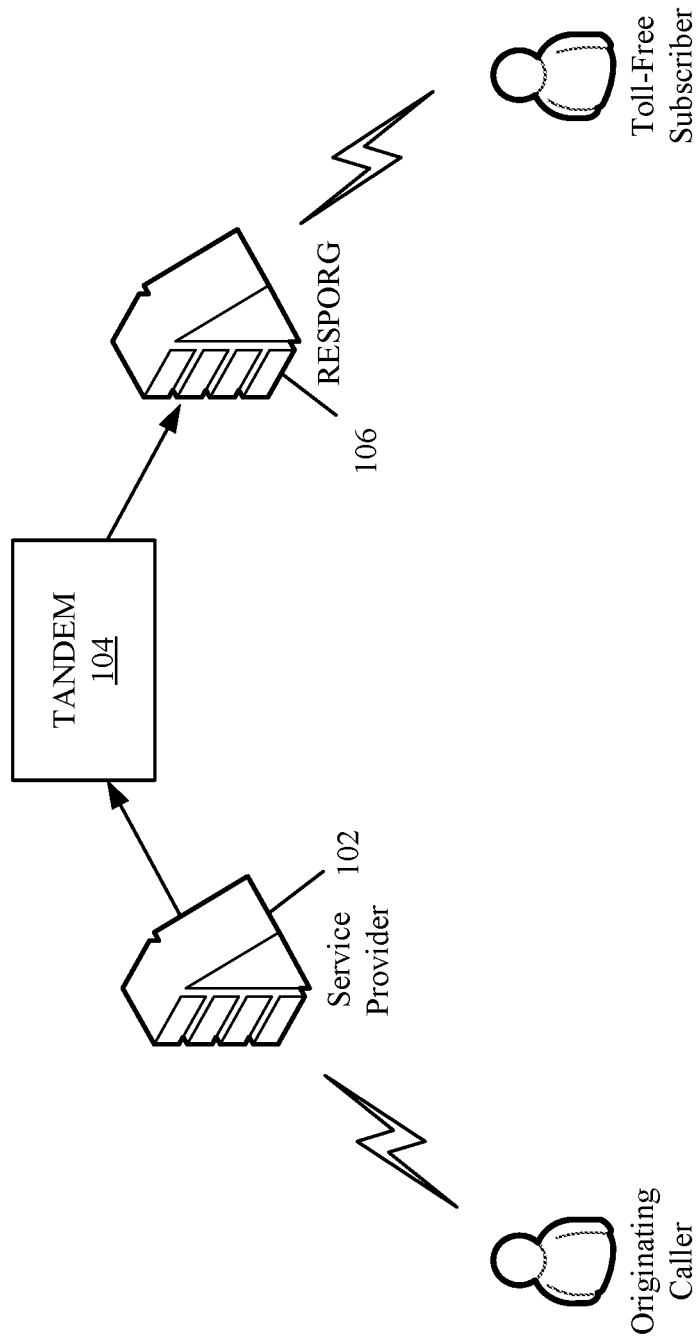
FIG. 1 is a block diagram illustrating a traditional call connection of a toll-free call.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general terms, this disclosure is directed to a method of routing toll-free telephone calls using a toll-free exchange, thereby minimizing the number of hand-offs and reducing the ultimate cost of the toll-free call. As described herein, toll-free subscribers are generally assessed a per minute fee based on a LEC tariff plus a margin for each network and service provider that carriers the call to the subscriber. It is therefore a benefit of the present disclosure to minimize the number of networks and simplify the process of directing a toll-free telephone call by providing a toll-free exchange, details of which are further provided herein.

FIG. 1 is a block diagram illustrating a traditional call connection of a toll-free call or, indeed, any long distance call. As illustrated, a caller places a call by dialing a desired toll-free number using a telephone such as a telephone connected to a landline or a cellular phone. The call is routed to the user's service provider 102 that manages each of the incoming and outgoing calls of the user. In some embodiments, the service provider 102 is a RESPORG. The service provider 102, using the toll-free number, performs a look up of the Carrier Identification Code (CIC) for the dialed toll-free number. As shown in FIG. 1, in this example, the service provider 102 sends the call to a tandem switch 104 used to exchange traffic between multiple service providers. In some example embodiments, the tandem switch 104 is owned by the incumbent local exchange carrier (ILEC) of the originating caller's service provider 102. The service provider 102 provides the tandem switch 104 with the call and the identified CIC code. The tandem switch 104 thereafter connects the call to the LEC identified by the CIC 106, who may or may not also act as the RESPORG of the toll-free subscriber. The service provider 106 thereafter accepts the call and carries the call to the toll-free subscriber. Accordingly, the toll-free call is 'terminated' to the toll-free subscriber and a call is established.

Figure 2:
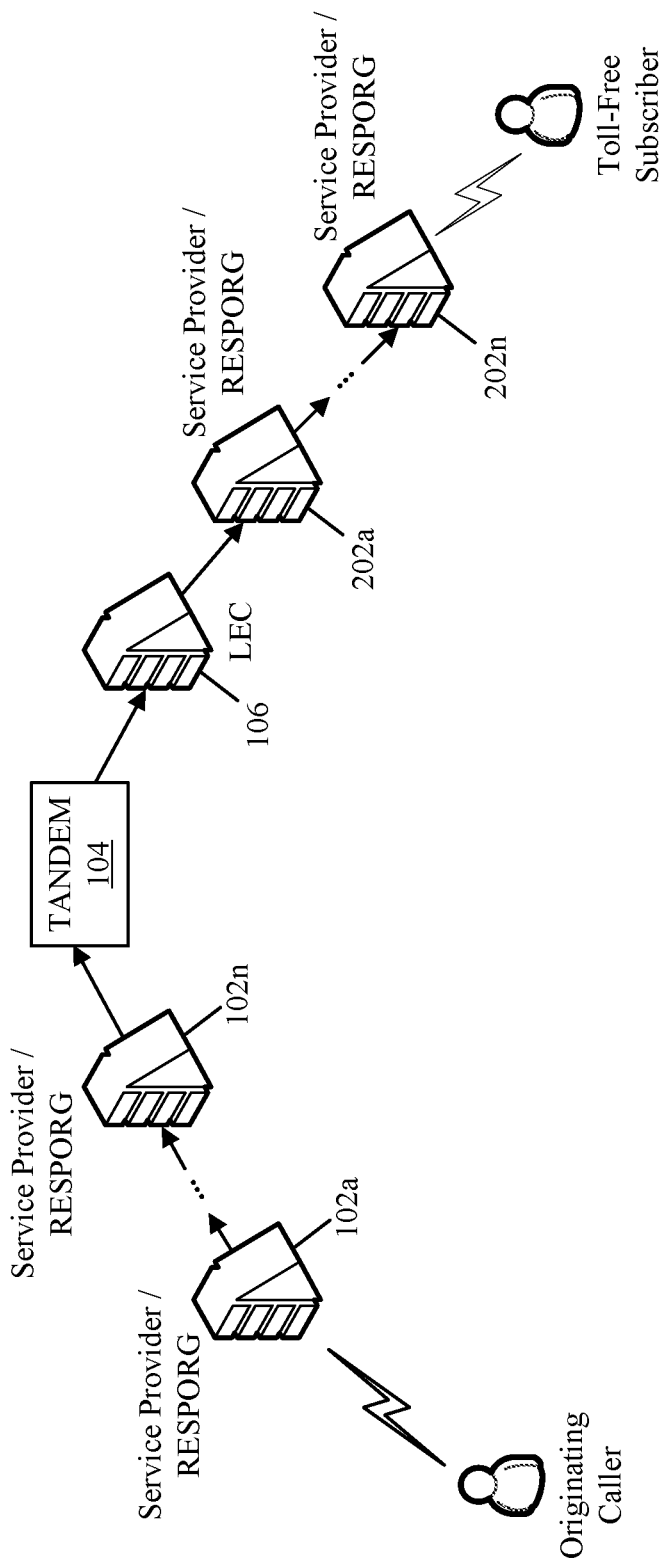
FIG. 2 is a block diagram illustrating an alternative embodiment of a traditional call hand-off of a toll-free call.

FIG. 2 is a block diagram illustrating an alternative embodiment of a traditional call hand-off of a toll-free call. As illustrated, a caller places a call by dialing a desired toll-free number using a telephone such as a telephone connected to a landline or a cellular phone. The call is routed to the user's service provider 102a that handles each of the incoming and outgoing calls of the user. As illustrated in FIG. 2, there may be multiple service providers 102a-102n that are used to connect the call to the tandem 104. In this embodiment, service provider 102n, using the toll-free number, performs a look up of the CIC for the dialed toll-free number. In this example, the service provider 102n then sends the call and the CIC to a tandem switch 104 used to exchange traffic between multiple service providers. The tandem switch 104 thereafter connects the call to the LEC identified by the CIC 106. In this example, the toll-free number is not provided to the toll-free subscriber via the LEC 106, but rather through a service provider and RESPORG 202a. As illustrated in FIG. 2, there may be multiple service providers or RESPORGs 202a-202n that are used to connect the call to the terminating RESPORG 202n. In such an embodiment, the LEC 106 connects the call to the service provider or RESPORG 202a, which thereafter routes the call to service provider or RESPORG 202n. The service provider or RESPORG 202n thereafter routes the call to the toll-free subscriber. As illustrated in this alternative embodiment, additional entities (e.g., service provider/RESPORGs) are used to connect the call from the originating caller to the toll-free subscriber, thereby adding additional costs to the toll-free subscriber and additional complexity to the call exchange process.

The cost structure of toll-free systems is based on a reverse long distance billing process. As described herein, toll-free systems provide originating callers with the ability to place free telephone calls. In other words, it is the called party—in this case the subscriber of the toll-free number—who pays for each call received rather than the calling/originating party. Accordingly, because service provider 102 is owed compensation—known as the "End Office"—from the CIC holder for the use of its network to connect the call to the tandem, and the tandem provider is owed compensation from the CIC holder for the tandem function, service provider 102 and tandem provider 104 are paid by the service provider 106, which is paid by the RESPORG 202, which is paid by the toll-free subscriber. In some embodiments, each subsequent payment is of a decreasing value due to, in some examples, regulatory misinterpretation and rampant litigation such that service provider 102 may not recoup its costs for the use of its network. It is understood that although a limited number of service providers, RESPORGs, and tandems are illustrated, it is understood that there may be one or multiple such service providers, RESPORGs, or tandems involved in the call hand-off of a toll-free call. For example, there may be multiple other PSTN, SS7 and VoIP networks, RESPORGs, services providers, and tandems involved in the routing of a toll free call from the calling to the called party.

Figure 3:
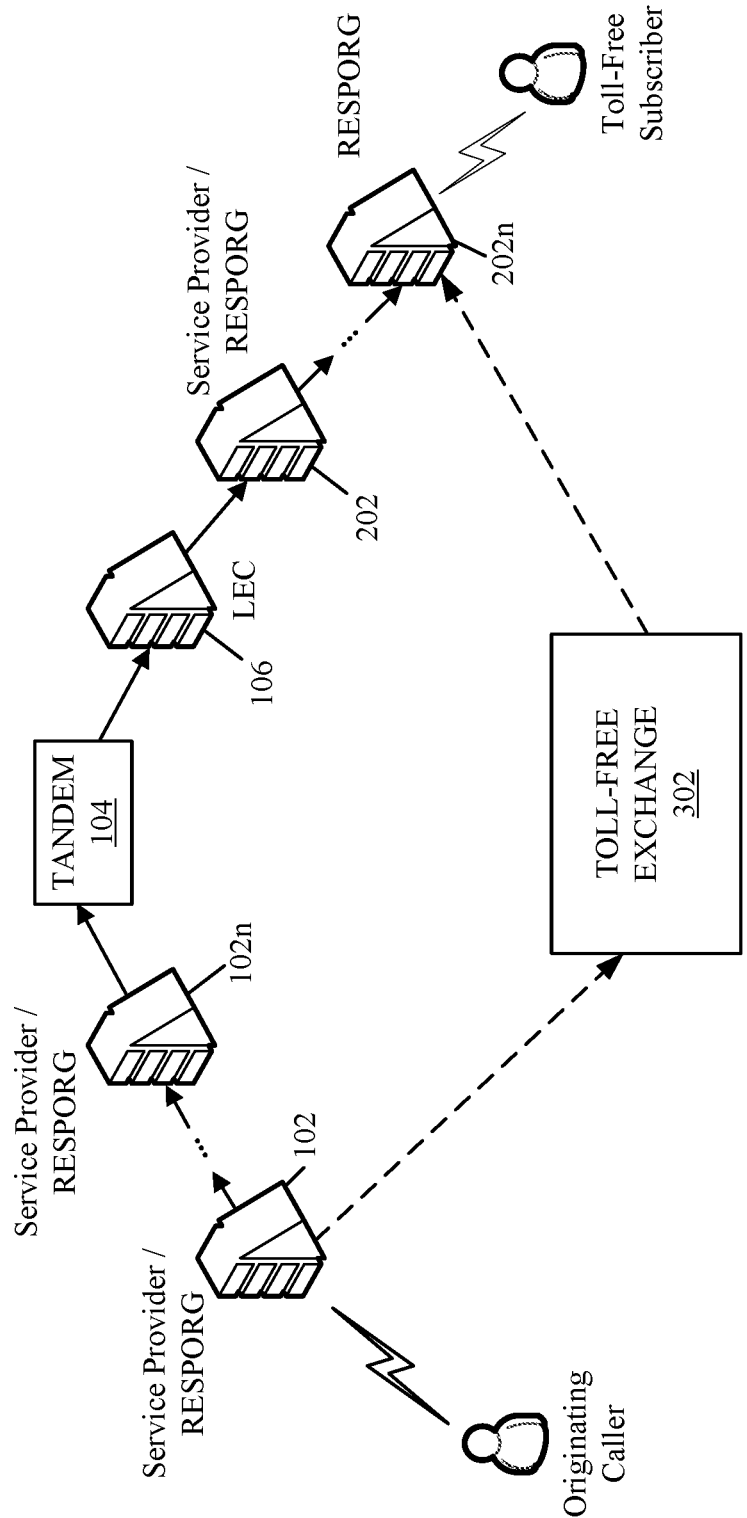
FIG. 3 is a block diagram illustrating a call hand-off based on principles of the present disclosure.

FIG. 3 is a block diagram illustrating a different and novel method of routing a toll-free call using a toll-free exchange 302, thus bypassing one or more exchanges in the traditional phone network. Generally, the toll-free exchange 302 is a system used to route calls based on the RESPORG ID of the RESPORG associated with the toll-free subscriber. More specifically, the toll-free exchange 302 allows service provider or RESPORG 102 and 202 to register with the toll-free exchange 302, thereby providing the necessary information for the toll-free exchange 302 to terminate the toll-free call between the two parties without going through any number of tandem switches, LECs, service providers, or RESPORGs. Although service provider 102 may not be listed as a RESPORG, in embodiments in which the service provider 102 manages a toll-free number, the service provider 102 is also a RESPORG that is responsible for managing calls communicated to and from the toll-free number. Furthermore, the toll-free exchange 302 allows registered RESPORGs to set a buy rate, which is the rate at which that terminating RESPORG will pay the originating party, such as service provider 102, for routing a call to it. Alternatively or additionally, the originating RESPORG may set a sell rate, which is the rate at which that originating RESPORG will pay the terminating party. Although references herein are made towards the buy rate, it is also understood that a sell rate may also be used.

As described in further detail herein, using the disclosed toll-free exchange 302, toll-free call routing is no longer based on looking up a CIC of the terminating service provider or RESPORG, but rather, routing is performed based simply on looking up the RESPORG ID associated with the terminating RESPORG. Still further, the toll-free exchange 302 allows registered RESPORGs to set a buy rate at which it may pay an originating RESPORG or service provider for connecting a call. Accordingly, the toll-free exchange 302 provides terminating RESPORGs with the ability to set its own rate it is willing to pay an originating service provider or RESPORG. Aspects of the present disclosure further allow originating RESPORGs to set a floor rate, which indicates a minimum rate it will accept in order to route the call through the toll-free exchange 302 and to the terminating RESPORG. Accordingly, aspects of the present disclosure provide RESPORGs with the option to participate on the toll-free exchange 302 and receive payment at the terminating provider's predetermined buy rate while simultaneously reducing the number of exchanges involved in terminating the call to the toll-free subscriber, thus reducing the cost of the call. Although it is noted that the floor rate is associated with the originating RESPORG and the buy rate is associated with the terminating RESPORG, it is understood that any RESPORG may function as an originating RESPORG and a terminating RESPORG. Accordingly, any one RESPORG may have both a floor rate and a buy rate associated therewith.

As described in further detail herein, the toll-free exchange 302 monitors call traffic to calculate and provide an accounting of such payments as based on each RESPORG's set buy rate. In some embodiments, the buy rate or the floor rate is a "per second" rate, and in other embodiments, it is a "per minute" rate, a fixed fee rate, or a negotiated fee rate specific to the parties. Thus, in an embodiment the total payment owed to an originating service provider or RESPORG may be calculated based on the duration of the toll-free call multiplied by the buy rate.

Figure 4:
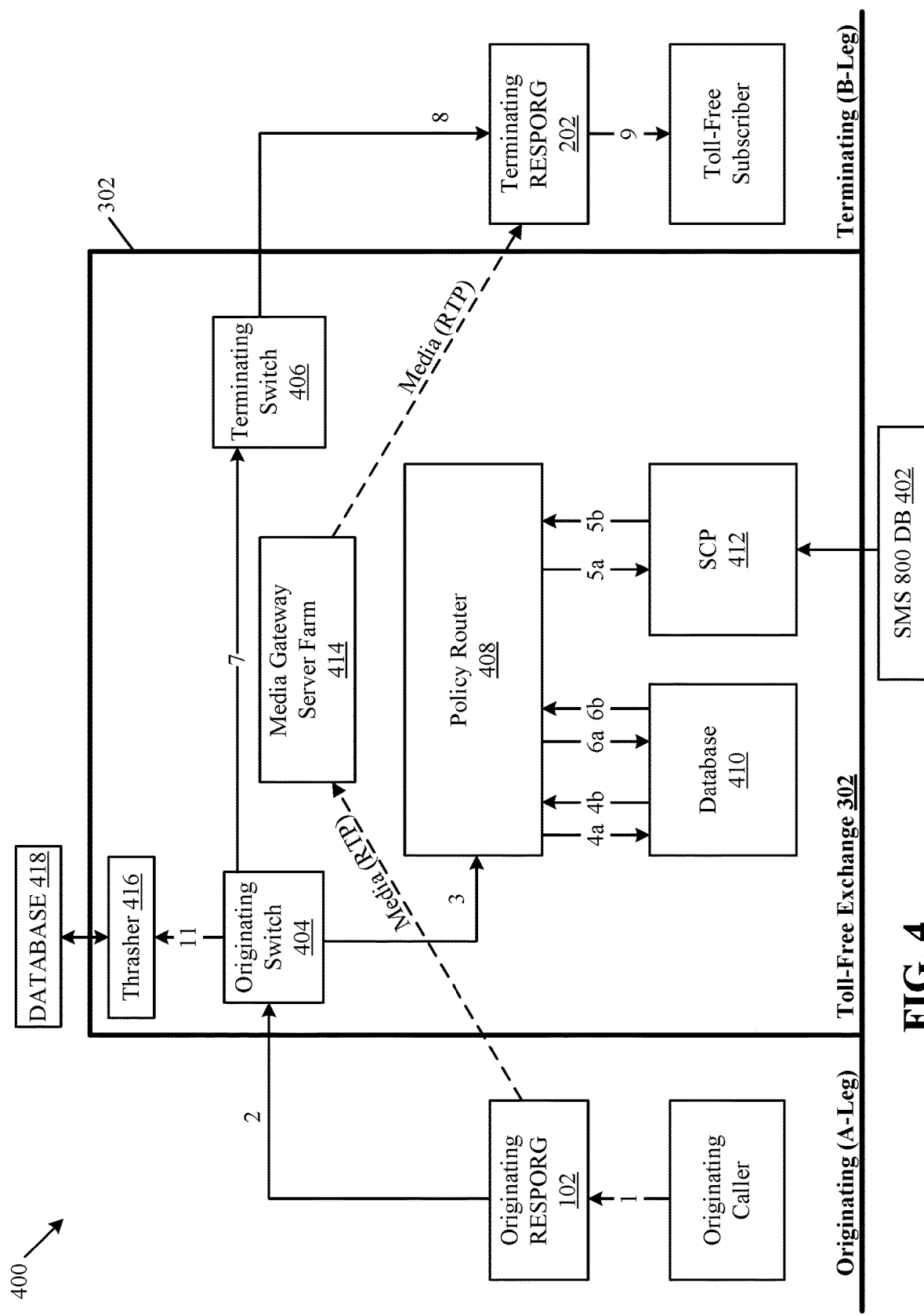
FIG. 4 is a block diagram illustrating an example environment with which a toll-free exchange interacts according to principles of the present disclosure.

FIG. 4 is a block diagram illustrating an example environment 400 with which a toll-free exchange 302 interacts according to principles of the present disclosure. As illustrated, the toll-free exchange 302 communicates with the originating service provider 102 and the terminating service provider 202 as well as the SMS 800 Database 402. As illustrated in these examples, both the originating service provider 102 and the terminating service provider 202 are RESPORGs having RESPORG IDs that are registered with the toll-free exchange. It is understood, however, that in other examples, one or more of the originating service provider 102 and the terminating service provider 202 are not enrolled with the toll-free exchange 302.

As illustrated in this example, the toll-free exchange 302 includes an originating switch 404 and a terminating switch 406. In some examples the originating switch 404 and the terminating switch 406 are each session border controllers (SBCs) that function to route communication data packets and metadata. In this example, the toll-free exchange 302 further includes a policy router 408, which includes the routing logic and decision-making of the toll-free exchange 302. The toll-free exchange 302 also includes a database 410 for storing RESPORG IDs, buy rates and other data of RESPORGs that participate in the toll-free exchange 302. The toll-free exchange 302 further includes a Service Control Point (SCP) 412 that interacts with the SMS-800 database to obtain RESPORG IDs of registered RESPORGs. In this example, the toll-free exchange 302 also includes a media gateway server farm 414, which is configured to process the media data, such as voice and video data of the calls routed through the exchange 302. Finally, in this example, the toll-free exchange 302 includes a thrasher 416 used to collect call detail records (CDRs) for accounting and administrative purposes. Although the listed elements are depicted as being part of the toll-free exchange 302, it is noted that this is merely an illustrative example and any combination of elements may be used to implement the toll-free exchange 302. For example, the exchange could be implemented as a unitary set of equipment housed at a single location or, alternatively, could be individual elements distributed over different locations but connected electronically.

As described herein, the originating caller places a toll-free call by dialing a toll-free number. As indicated by arrow 1, the call is routed to the user's service provider. It is understood that the user's service provider need not be a RESPORG, however, for purposes of this illustrative example, the user's service provider will be referred to herein as the originating RESPORG 102, which is the entity responsible for handling each of the incoming and outgoing calls of the originating caller. In some embodiments, the originating RESPORG 102 may be a communications company such as Verizon Wireless of Basking Ridge, N.J.

Upon receiving the call, the originating RESPORG 102 routes the call to the toll-free exchange 302, as illustrated by arrow 2. More specifically, the originating RESPORG 102 routes the call to the originating switch 404 of the toll-free exchange 302. In this example embodiment, the originating switch 404, or the SBC, includes control software that routes the data portion of the call to the policy router 408 (as indicated by arrow 3). As indicated by the dashed lines, the media (voice and video) portion of the call is routed directly to the media server gateway farm 414 using, for example, the Real-time Transport Protocol (RTP). The toll-free call includes a data portion, or for example, a header including various metadata relating to the call. Such metadata may include the IP address associated with the originating RESPORG 102 and the originating caller, the floor rate and buy rate associated with that RESPORG 102, etc. The originating switch 404 informs the policy router (as indicated by arrow 3) of the incoming call. In particular, the originating switch 404 queries the policy router 408 regarding whether an IP address associated with the toll-free number is allowed to access the toll-free exchange 302 as an initial authentication procedure.

The database 410 may store, among other items, an access control list (ACL) that lists each of the RESPORGs enrolled on the toll-free exchange 302. In some embodiments, the ACL includes a list of IP addresses associated with each enrolled RESPORG, yet in other embodiments, other identifying information is included on the ACL. As indicated by arrow 4a, the policy router 408, using the IP address of the originating RESPORG 102, queries the database 410 regarding whether the originating RESPORG 102 is listed on the ACL, and therefore granted access to the toll-free exchange 302. In an example embodiment, RESPORGs that wish to participate in the toll-free exchange 302 register with the toll-free exchange 302. Registering with the toll-free exchange 302 may involve, for example, registering RESPORG information such as the RESPORG ID, IP information and setting appropriate floor and buy rates. In some embodiments, an administrator of a RESPORG seeking to register with the toll-free exchange 302 may register via an enrollment website. Such registration information is stored in the database 410.

In this example, the policy router 408, which is further described with reference to FIG. 5, includes the logic of the toll-free exchange 302. As described herein, the database 410 stores, among other information, data relating to each RESPORG registered with the exchange such as, for example, RESPORG IP addresses, and the predetermined floor and buy rates associated with each registered RESPORG. In order to determine whether the originating RESPORG 102 is enrolled with the toll-free exchange 302, the policy router 408 queries the database 410 to look up, on the stored ACL, the IP address associated with the originating RESPORG 102. In an example, the database 410 determines whether the originating RESPORG 102 is an identified IP address on the ACL. Determining whether the originating RESPORG 102 is enrolled with the toll-free exchange 302 also returns the floor rate set by the originating RESPORG 102. As described herein, the floor rate set by the originating RESPORG 102 indicates a minimum rate at which the originating RESPORG 102 will accept in order to route the call through the toll-free exchange 302, wherein the minimum rate is paid by the terminating RESPORG 202.

If, in this example, the originating RESPORG 102 is not registered with the toll-free exchange 302, the database 410 will return a response (as indicated by arrow 4b) indicating the RESPORG is not enrolled with the toll-free exchange 302, or returns a null response. As such, the policy router 408 may signal to the originating switch 404 to reject the call. The RESPORG 102 then may access the traditional telephone network and the call is completed using one of the traditional methods as described with reference to FIGS. 1 and 2. If, however, the originating RESPORG 102 is registered with the toll-free exchange 302, the database 410 returns a response (as indicated by arrow 4b) to the policy router 408 specifying that the originating RESPORG 202 is enrolled with the toll-free exchange 302 as well as the floor rate associated therewith. In some embodiments, the database 410 further returns the RESPORG ID associated with the enrolled originating RESPORG 102.

The policy router 408 (as indicated by arrow 5a), using the dialed toll-free number, queries the SCP 412 for the RESPORG ID of the terminating RESPORG 202 that is associated with managing the toll-free number. As described herein, the toll-free exchange 302 uses the RESPORG ID of the terminating RESPORG 202 to route toll-free telephone calls to the toll-free subscriber. RESPORG IDs are assigned by and stored in a national SMS-800 database and accessible by the toll-free exchange 302 through the utilization of a Service Control Point (SCP) 412, or other methods. In this illustrative embodiment, the SCP 412 is a clone of the SMS-800 database. In other words, the SCP 412 stores each RESPORG ID that is registered with the SMS-800 database. In some embodiments, the SCP 412 updates its database daily, and in other embodiments the SCP 412 updates its database with RESPORG IDs on a lesser or more frequent basis. The SCP 412 may initiate a request, such as by a PUSH request, to the SMS-800 database to receive RESPORG ID updates. Alternatively or additionally, the SCP 412 may receive updates, such as by a PULL request, from the SMS-800 database to receive RESPORG ID updates.

Accordingly, the policy router 408 provides the SCP 412 with the toll-free number (as indicated by arrow 5a) to look up the RESPORG ID of the terminating RESPORG 202.

The SCP 412 returns a response (as indicated by arrow 5b) to the policy router 408 providing the RESPORG ID of the terminating RESPORG 202.

Using the RESPORG ID of the terminating RESPORG 202, the policy router 408 queries the database 410 (as indicated by arrow 6a) to determine whether the terminating RESPORG 202 is registered with the toll-free exchange 302. If, in an example, the terminating RESPORG 202 is not registered with the toll-free exchange 302, the database 410 returns a response (as indicated by arrow 6b) indicating the terminating RESPORG 202 is not registered with the toll-free exchange 302, or a null response. As such, the policy router 408 signals the originating switch to reject the call and the call is completed using one of the traditional methods as described with reference to FIGS. 1 and 2. Alternatively, if the terminating RESPORG 202 is registered with the toll-free exchange 302, the database 410 returns a response (as indicated by arrow 6b) to the policy router 408 specifying the terminating RESPORG 202 is registered with the toll-free exchange 302, the IP address of the terminating RESPORG 202, and the predetermined buy rate, and any additional information relating to the terminating RESPORG 202. Depending on the embodiment, any additional information needed by the exchange to complete the call may also be stored on the database 410 and sent to the policy router 408.

Although the above-described embodiments describe example scenarios in which a call is completed based on both the originating RESPORG 102 and terminating RESPORG 202 being enrolled with the toll-free exchange 302, registration of the terminating RESPORG 202 is not necessary for the registered originating RESPORG 102 to complete a call. Although calls are originated by a registered/enrolled RESPORG 102, calls may still be routed even though the terminating RESPORG 202 is not registered/enrolled with the toll-free exchange 302. If the terminating RESPORG 202 is not registered/enrolled, the toll-free exchange 302 may route the call to the PSTN instead of returning the call to the originating RESPORG 102. This decision, which is made by the policy router 408, is based on a pre-defined set of criteria configured by the registered originating RESPORG 102. In other words, the originating RESPORG 102 may specify whether it prefers to route a call through the toll-free exchange 302 regardless if the terminating RESPORG is registered with the toll-free exchange 302. Such an indication may be included in the meta information, stored in a header of the toll-free call.

As indicated by arrow 7, the policy router 408 informs the originating switch 404 to attach the IP address of the terminating RESPORG 202, and any additional information, if necessary, to a header of the signaling packet for the call, which is passed to the media gateway server farm 414. In example embodiments, the originating switch 404 attaches a Session Initiation Protocol (SIP) header including the IP address of the terminating RESPORG 202.

As described herein, the media gateway server farm 414 processes the media portion of the call, such as the voice or video data of the call. In some embodiments, the media gateway server farm 414 processes the media such as compressing and configuring the media to be carried over a network to the terminating RESPORG 202. In an example embodiment, the toll-free call is placed over a voice over IP network (VoIP). In such an example, the media gateway server farm 414 configures the voice data of the call to be carried over a network to the terminating RESPORG 202 using the Real-time Transport Protocol (RTP).

In some embodiments, the media gateway server farm 414 also provides load balancing in order to process voice data. Toll-free calls typically occur more often during the day and gradually decrease during evening and early morning hours. Accordingly, the media gateway server farm 414 provides the necessary load balancing to distribute voice and video processing over one or more servers based on the time of day and call traffic experienced by the media gateway server farm 414. The media gateway server farm 414 will expand or contract in size automatically to provide sufficient computing resources to adapt to call volume.

In some embodiments, the media gateway server farm 414 includes a plurality of computing devices such as one or more servers, wherein the servers may be located in a single geographical area and in other embodiments, the servers may be located across several remote sites. In an embodiment, some or all of the media gateway server farm 414 may be leased on-demand from a third-party server provider, such as Amazon or Google, and implemented as a 'cloud service.'

As described herein, once the identity of the terminating RESPORG 202 is determined, the originating switch 404 provides the call signaling to the terminating switch 406 (as indicated by arrow 7). The processed media data is also provided to the terminating RESPORG 202 directly by the media gateway server farm 414. The terminating switch 406 reads the IP address included in the header of the media data packet and forwards the data packet to the identified terminating RESPORG 202 (as indicated by arrow 8). In the example of a VoIP call, the call is transmitted to the terminating RESPORG 202 over a communication network, such as the Internet. Finally, the terminating RESPORG 202 terminates the call to the toll-free subscriber (as indicated by arrow 9).

As described herein, the toll-free exchange 302 monitors each call sent through the toll-free exchange 302 and provides administrative and accounting services to the registered RESPORGs. As such, the toll-free exchange 302 includes a thrasher 416 that monitors each call and provides a call detail record. In particular, the call detail record includes, for example, the duration of the call, the parties involved, the buy rate of the terminating RESPORG 202, and the resulting cost associated with the call, to be paid by the terminating RESPORG 202 to the toll-free exchange 302 and in part to the originating RESPORG 102. In some embodiments, the thrasher saves the call records in a database 418. In embodiments, the database 418 is a cloud-based database, and in other embodiments, the database is hosted within the toll-free exchange 302. In an example, the database 418 is accessible by each registered RESPORG, which allows each RESPORG to view its call records. In some embodiments, the database 418 further provides each RESPORG with analytical data as well as data identifying each RESPORG participating on the toll-free exchange 302.

Figure 5:
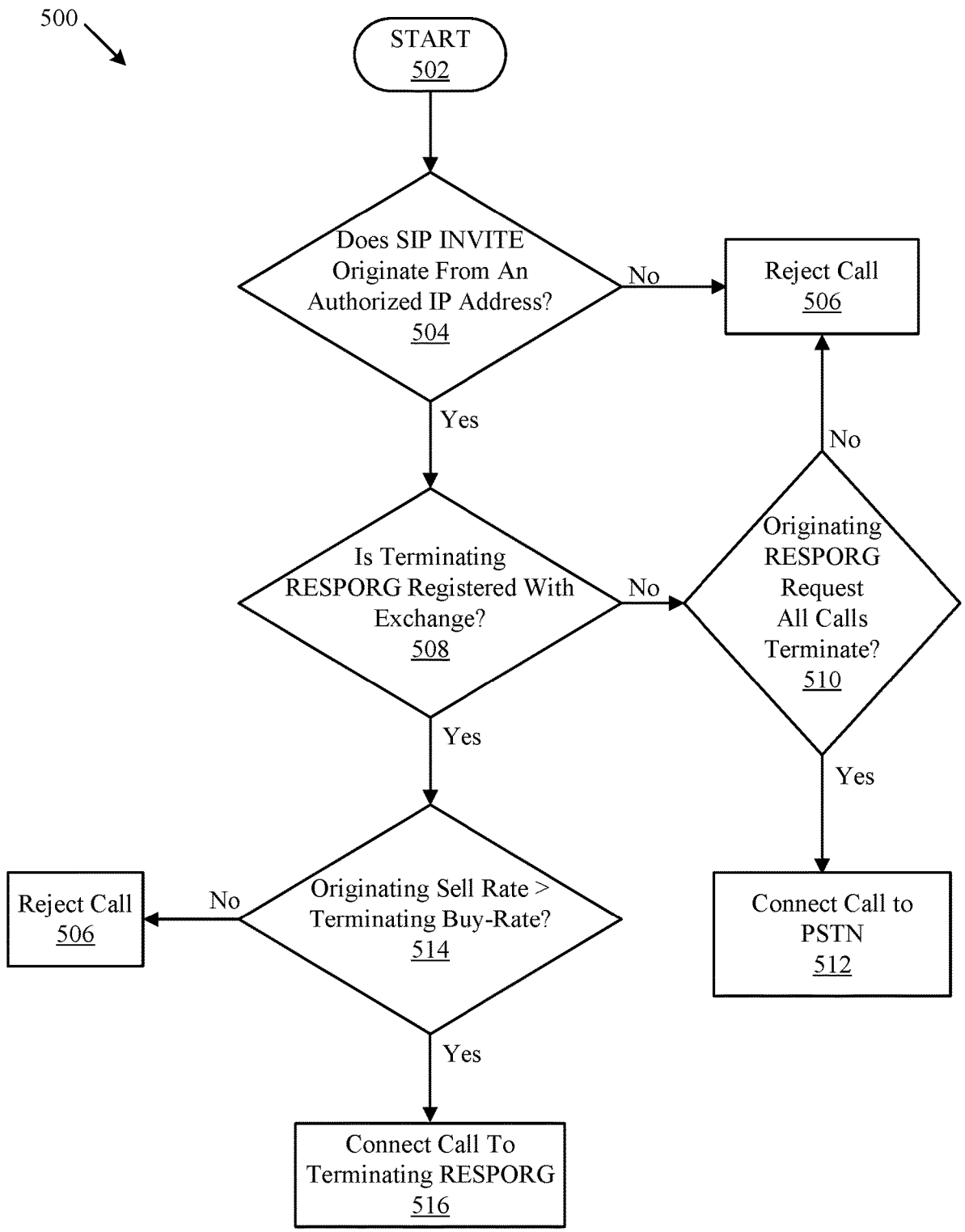
FIG. 5 is a flow chart illustrating an example method performed by the policy router of the toll-free exchange.

FIG. 5 is a flow chart illustrating an example method 500 performed by the policy router 408 of the toll-free exchange 302. As described herein, the policy router 408 includes the logic and decision-making of the toll-free exchange 302. Generally, the policy router 408 is configured to route calls to terminating RESPORGs. As illustrated in the flow chart of FIG. 5, the policy router 408 begins at start block 500.

The method flows to the authentication step 504. In the authentication step 504, the policy router 408 determines whether the originating RESPORG 102 is an authorized RESPORG (for example, as being listed on an access control list). In some embodiments, the originating switch 404 communicates with the originating RESPORG 102 via the Session Initiation Protocol (SIP). In other embodiments, other protocols may be used. Accordingly, the policy router 408, using meta information (such as an IP address or other identifying information, depending on the connection protocol used) of the originating RESPORG 102, queries the database 410 to determine whether the originating RESPORG 102 is allowed to access the toll-free exchange 302 as determined by being listed on an access control list. In an example, the database 410 performs a look up of the meta information, such as the IP address of the originating RESPORG 102 to determine whether the originating RESPORG 102 is listed on a stored access control list. If the database 410 determines that the originating RESPORG 102 is not listed on the access control list, the database provides the policy router 408 with a negative response, such as a "no" response and the call is rejected, as indicated by step 506. If, however, the originating RESPORG 102 is listed on the access control list, the database 410 provides the policy router 408 with an affirmative response such as a "yes" response and the method 500 proceeds to the terminating RESPORG ID enrollment verification step 508.

In the terminating RESPORG ID enrollment verification step 508, the policy router 408 determines whether the terminating RESPORG 202 is enrolled with the toll-free exchange 302. As described with reference to FIG. 4, the policy router 408 uses the ten digit toll-free number dialed or requested by the originating RESPORG 102 to query the SCP 412 for the terminating RESPORG ID. As described, the SCP 412 stores RESPORG IDs associated with all RESPORGs registered with the national SMS-800 database 402. Using the RESPORG ID result from the SCP 412 the policy router 408 then queries the database 410 to determine whether the RESPORG ID of the terminating RESPORG 202 is registered with the toll-free exchange 302. In the enrollment verification step 508, if the database 410 does not identify the terminating RESPORG 202 as being registered with the toll-free exchange 302, the database 410 returns, to the policy router 408, a "no" response and the method 500 proceeds to the request termination step 510.

In the request termination step 510, the policy router 408 determines whether the originating RESPORG 102 requested the toll-free exchange 302 to terminate calls to the terminating RESPORG 202 irrespective of the enrollment status of the terminating RESPORG 202. If, in the request termination step 510, the policy router 408 determines that the originating RESPORG 102 requested the toll-free exchange 302 to terminate calls irrespective of the enrollment status of the terminating RESPORG 202, the method proceeds to the connect call step 512. In some embodiments, this request is included in a message header of the toll-free call.

In the connect call step 512, because the terminating RESPORG 202 is not enrolled with the toll-free exchange 302, the policy router instead connects the call directly to the PSTN where traditional CIC based routing and termination will occur.

If, however, in the request termination step 510, the policy router 408 determines that the originating RESPORG 102 did not request to terminate calls to a non-participating terminating RESPORG 202, the method 500 proceeds to step 506 and the call is rejected.

In the enrollment verification step 508, if the policy router 408 determines that the terminating RESPORG 202 is enrolled with the toll-free exchange 302, the method 500 flows to the rate comparison step 514. In the rate comparison step 514, the policy router 408 determines whether the floor rate of the originating RESPORG 102 is less than the buy-rate of the terminating RESPORG 202. Effectively, the policy router 408 determines whether it is cost beneficial for the originating RESPORG 102 to connect the call to the terminating RESPORG 202. If the policy router 408 determines that the floor rate of the originating RESPORG 102 is less than the buy-rate of the terminating RESPORG 202, the method 500 proceeds to the connect call step 516. In the connect call step 516, the policy router 408 uses the RESPORG ID of the terminating RESPORG 202 to connect the call.

If, however, the policy router 408 determines that the floor rate of the originating RESPORG 102 is greater than the buy-rate of the terminating RESPORG 202, the method 500 proceeds to step 506 and the call is rejected.

Thus, the method described in FIG. 5 routes a toll-free call using the RESPORG ID and without use or knowledge of the carrier identification code (CIC) associated with the terminating traditional public switched networks. The exchange also allows for modern innovations such as native video and high-definition voice calls that are not possible on traditional public switch networks. In addition, the method can connect calls using only one exchange and also maintains a single accounting of the cost associated with connecting the call. These features distinguish it over the prior art method that may utilize multiple exchanges in which each exchange maintains its own switching infrastructure and accounting of the portion it handles.

Figure 6:
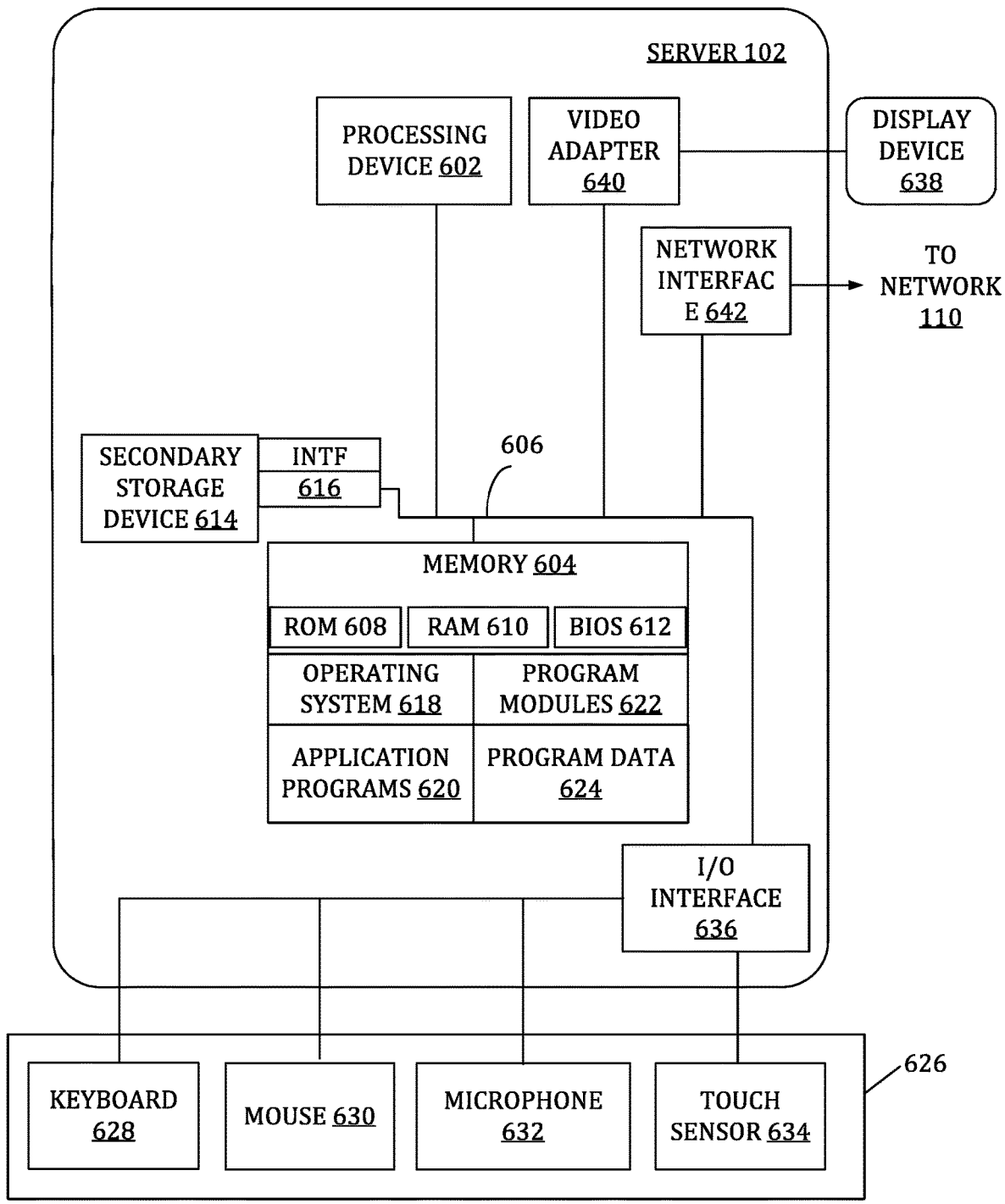
FIG. 6 illustrates an exemplary architecture of a computing device that can be used to implement aspects of the toll-free exchange.

FIG. 6 illustrates an exemplary architecture of a computing device that can be used to implement aspects of the toll-free exchange 302. In this disclosure, a laptop or personal computer 140, tablet computing device 140, phone 140, and servers 150 are example computing devices. FIG. 6 can be used to implement aspects of the present disclosure including any of the plurality computing devices, such as the policy router 408 as illustrated in and described with reference to FIG. 4. The computing device described in FIG. 6 can be used to execute the operating system, application programs, and software modules (including the software engines) described herein. By way of example, the computing device will be described below as the computing device 650. To avoid undue repetition, this description of the computing device will not be separately repeated herein for each of the other computing devices, including policy router 408, but such device can also be configured as illustrated and described with reference to FIG. 6.

The computing device 650 includes, in some embodiments, at least one processing device 602, such as a central processing unit (CPU). A variety of processing devices are available from a variety of manufacturers, for example, Intel or AMD. In this example, the computing device 650 also includes a system memory 604, and a system bus 606 that couples various system components including the system memory 604 to the processing device 602. The system bus 606 is one of any number of types of bus structures including a memory bus, or memory controller; a peripheral bus; and a local bus using any of a variety of bus architectures.

Examples of computing devices suitable for the computing device 650 include a server computer, a desktop computer, a laptop computer, a tablet computer, a mobile computing device (such as a smart phone, an iPod® or iPad® mobile digital device, or other mobile devices), or other devices configured to process digital instructions.

The system memory 604 includes read only memory 608 and random access memory 610. A basic input/output system 612 containing the basic routines that act to transfer information within computing device 650, such as during start up, is typically stored in the read only memory 608.

The computing device 650 also includes a secondary storage device 614 in some embodiments, such as a hard disk drive, for storing digital data. The secondary storage device 614 is connected to the system bus 606 by a secondary storage interface 616. The secondary storage devices 614 and their associated computer readable media provide nonvolatile storage of computer readable instructions (including application programs and program modules), data structures, and other data for the computing device 650.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules, such as executable computer programs, can be stored in secondary storage device 616 or memory 604, including an operating system 618, one or more application programs 198, other program modules 622 (such as the software engines described herein, including one or more of the user accounts management engine 202, spending rules engine 204, merchant communication engine 206, transaction communication engine 208, and reporting engine 210), and program data 624. The computing device 650 can utilize any suitable operating system, such as Microsoft Windows™, Google Chrome™, Apple OS, and any other operating system suitable for a computing device.

In some embodiments, a user provides inputs to the computing device 650 through one or more input devices 626. Examples of input devices 626 include a keyboard 628, mouse 630, microphone 632, and touch sensor 634 (such as a touchpad or touch sensitive display). Other embodiments include other input devices 626. The input devices are often connected to the processing device 602 through an input/output interface 636 that is coupled to the system bus 606. These input devices 626 can be connected by any number of input/output interfaces, such as a parallel port, serial port, game port, or a universal serial bus. Wireless communication between input devices and the interface 636 is possible as well, and includes infrared, BLUETOOTH® wireless technology, 802.11a/b/g/n, cellular, or other radio frequency communication systems in some possible embodiments.

In this example embodiment, a display device 638, such as a monitor, liquid crystal display device, projector, or touch sensitive display device, is also connected to the system bus 606 via an interface, such as a video adapter 640. In addition to the display device 638, the computing device 650 can include various other peripheral devices (not shown), such as speakers or a printer.

When used in a local area networking environment or a wide area networking environment (such as the Internet), the computing device 650 is typically connected to the network 644 through a network interface 642 as an Ethernet interface. Other possible embodiments use other communication devices. For example, some embodiments of the computing device 650 include a modem for communicating across the network.

The computing device 650 typically includes at least some form of computer readable media. Computer readable media includes any available media that can be accessed by the computing device 650. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 650. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

In an alternative embodiment, aspects of the present disclosure may also be implemented with reference to text messaging. FIG. 2 illustrates a block diagram of traditional communication with a toll-free subscriber. In addition to voice calls, toll-free numbers can be used to send and receive text messages. Typically, an originating texter will draft a text message, using, for example, a short message service (SMS) component of a cellular phone to a toll-free subscriber. Typically, the text message is sent to the originating texter's service provider 102*a*. Thus, instead of data packets for a voice call, the originating texter will send one or more data packets, each representing a text message, to the service provider 102*a*. The service provider 102*a* may then route the one or more text message data packets to a tandem 104 service provider. Using the ten-digit toll-free number to which the text message is addressed, the tandem 104 routes the text message to the RESPORG 106 of the toll-free subscriber. The RESPORG 106 thereafter routes the text message to the toll-free subscriber.

Figure 7:
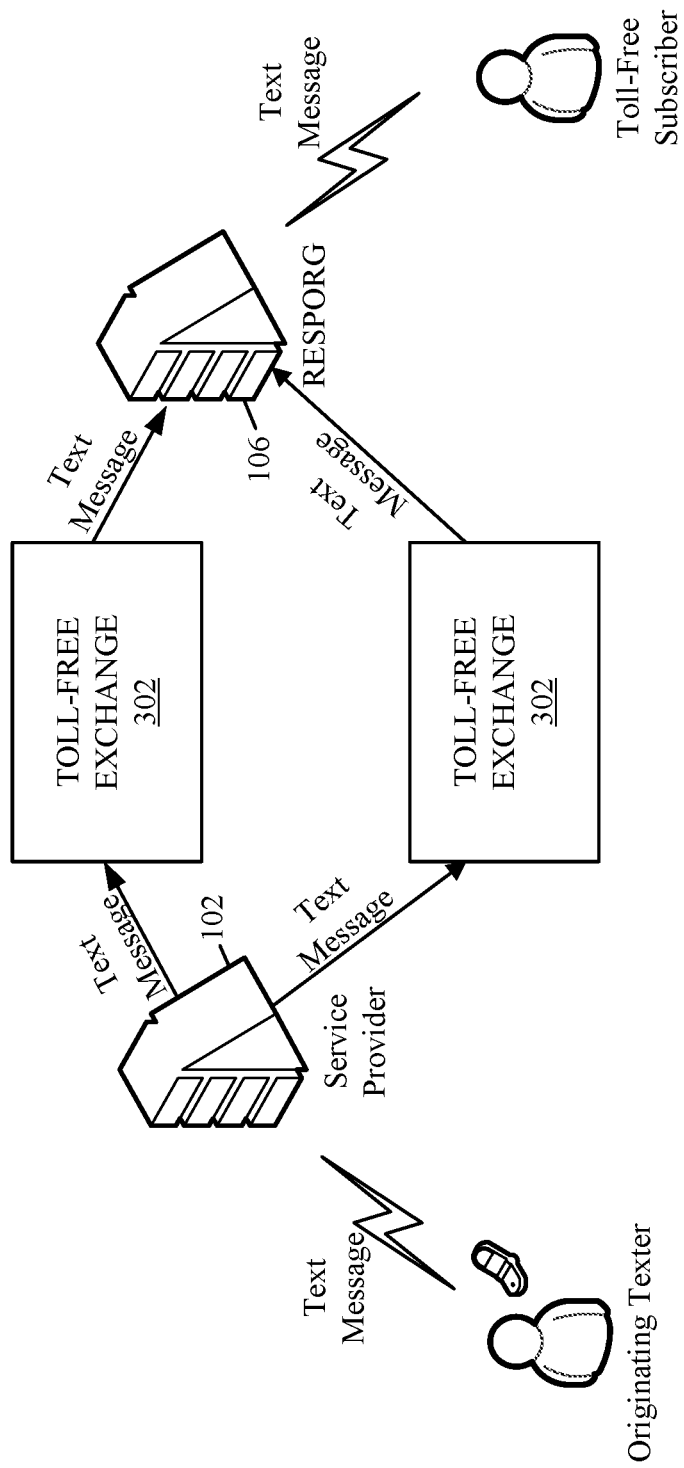
FIG. 7 is a block diagram illustrating different and novel method of routing a text message using a toll-free exchange, based on principles of the present disclosure.

FIG. 7 is a block diagram illustrating this different and novel method of routing a text message using a toll-free exchange 302, based on principles of the present disclosure. As illustrated, aspects of the present application can use a toll-free exchange 302 to route text messages. Similar to the routing of toll-free telephone calls as described herein, the toll-free exchange 302 may be used to look up the RESPORG ID associated with the ten-digit toll-free number and use that RESPORG ID for text message routing. In particular, the originating texter will draft a text message, using, for example, an SMS component of a cellular phone to a toll-free subscriber. In some configurations, the text message includes text, image(s), video(s), or any combination thereof. The text message is sent to the originating texter's service provider 102 that handles each of the incoming and outgoing text messages of the originating texter. As described herein, the toll-free exchange 302 is a system used to route calls based on the RESPORG ID of the RESPORG associated with the toll-free subscriber. According to novel configurations of the present disclosure, the toll-free exchange 302 is also used to route text messages based on the RESPORG ID of the RESPORG associated with the toll-free subscriber. More specifically, the toll-free exchange 302 allows service RESPORG 106 to register with the toll-free exchange 302, thereby providing the necessary information for the toll-free exchange 302 to terminate the text message between the two parties without going through any number of tandem switches, LECs, service providers, or RESPORGs.

The originating texter drafts a text message, which is routed to the originating texter's service provider or RESPORG 102. The service provider 102 thereafter routes the text message to the toll-free exchange 302. As described herein, and explained with reference to FIG. 4, the toll-free exchange 302 includes a policy router 408 for performing various functions of the toll-free exchange 302 including looking up RESPORG IDs, verifying registration information, identifying rates, etc. The toll-free exchange 302 further includes a session border controller for routing data portions of the text message within the toll-free exchange, a service control point that stores RESPORG IDs associated with enrolled RESPORGs, a database that stores enrollment information of each enrolled RESPORG. The toll-free exchange 302 may further include a media gateway server farm for routing a media portion of the text message, for example, a video or voice portion of a text message.

Similar to the description with reference to FIG. 4, the policy router 408 of the toll-free exchange 302 looks up the registration and rate information of the service provider 102 as well as the RESPORG ID of the terminating RESPORG 106 associated with the ten digit toll-free number to which the text message is directed. The toll-free exchange 302 further determines whether the RESPORG ID associated with the toll-free number is a registered RESPORG ID. If, in an example, the terminating RESPORG 106 is not registered with the toll-free exchange 302, the toll-free exchange 302 may not route the text message. If, however, the terminating RESPORG 106 is registered with the toll-free exchange, the toll-free exchange 302 may route the text message to that RESPORG 106, based on the looked up RESPORG ID. Accordingly, a novel configuration of the present disclosure provides routing of text messages to toll-free subscribers based on the RESPORG ID of the RESPORG associated with the toll-free number to which the text message is directed.

With reference to FIG. 4, illustrated is a block diagram of an example environment 400 with which a toll-free exchange 302 interacts according to principles of the present disclosure. As illustrated, the toll-free exchange 302 communicates with the originating service provider 102 and the terminating service provider 202 as well as the Database 402, such as for example, an SMS 800 database or SOMOS database. As illustrated in these examples, both the originating service provider 102 and the terminating service provider 202 are RESPORGs having RESPORG IDs that are registered with the toll-free exchange. It is understood, however, that in other examples, one or more of the originating service provider 102 and the terminating service provider 202 are not enrolled with the toll-free exchange 302.

As illustrated in this example, the toll-free exchange 302 includes an originating switch 404 and a terminating switch 406. In some examples the originating switch 404 and the terminating switch 406 are each session border controllers (SBCs) that function to route communication data packets and metadata. In this example, the toll-free exchange 302 further includes a policy router 408, which includes the routing logic and decision-making of the toll-free exchange 302. The toll-free exchange 302 also includes a database 410 for storing RESPORG IDs, buy rates and other data of RESPORGs that participate in the toll-free exchange 302. The toll-free exchange 302 further includes a Service Control Point (SCP) 412 that interacts with the SMS-800 database to obtain RESPORG IDs of registered RESPORGs. In this example, the toll-free exchange 302 also includes a media gateway server farm 414, which is configured to process the media data, such as media data of the text message routed through the exchange 302. Finally, in this example, the toll-free exchange 302 includes a thrasher 416 used to collect text message detail records (CDRs) for accounting and administrative purposes. Although the listed elements are depicted as being part of the toll-free exchange 302, it is noted that this is merely an illustrative example and any combination of elements may be used to implement the toll-free exchange 302. For example, the exchange could be implemented as a unitary set of equipment housed at a single location or, alternatively, could be individual elements distributed over different locations but connected electronically.

As described herein, the originating texter sends a text message directed to a toll-free number. As indicated by arrow 1, the text message is routed to the user's service provider. It is understood that the user's service provider need not be a RESPORG, however, for purposes of this illustrative example, the user's service provider will be referred to herein as the originating RESPORG 102, which is the entity responsible for handling each of the incoming and outgoing text messages of the originating texter. In some embodiments, the originating RESPORG 102 may be a communications company such as Verizon Wireless of Basking Ridge, N.J.

Upon receiving the text message, the originating RESPORG 102 routes the text message to the toll-free exchange 302, as illustrated by arrow 2. More specifically, the originating RESPORG 102 routes the text message to the originating switch 404 of the toll-free exchange 302. In this example embodiment, the originating switch 404, or the SBC, includes control software that routes the data portion of the text message to the policy router 408 (as indicated by arrow 3). As indicated by the dashed lines, the media (voice and video) portion of the text message is routed directly to the media server gateway farm 414 using, for example, the Real-time Transport Protocol (RTP). The text message includes a data portion, or for example, a header including various metadata relating to the text message. Such metadata may include the IP address associated with the originating RESPORG 102 and the originating texter, the floor rate and buy rate associated with that RESPORG 102, etc. The originating switch 404 informs the policy router (as indicated by arrow 3) of the incoming text message. In particular, the originating switch 404 queries the policy router 408 regarding whether an IP address associated with the toll-free number is allowed to access the toll-free exchange 302 as an initial authentication procedure.

The database 410 may store, among other items, an access control list (ACL) that lists each of the RESPORGs enrolled on the toll-free exchange 302. In some embodiments, the ACL includes a list of IP addresses associated with each enrolled RESPORG, yet in other embodiments, other identifying information is included on the ACL. As indicated by arrow 4a, the policy router 408, using the IP address of the originating RESPORG 102, queries the database 410 regarding whether the originating RESPORG 102 is listed on the ACL, and therefore granted access to the toll-free exchange 302. In an example embodiment, RESPORGs that wish to participate in the toll-free exchange 302 register with the toll-free exchange 302. Registering with the toll-free exchange 302 may involve, for example, registering RESPORG information such as the RESPORG ID, IP information and setting appropriate floor and buy rates. In some embodiments, an administrator of a RESPORG seeking to register with the toll-free exchange 302 may register via an enrollment website. Such registration information is stored in the database 410.

In this example, the policy router 408, which is further described with reference to FIG. 5, includes the logic of the toll-free exchange 302. As described herein, the database 410 stores, among other information, data relating to each RESPORG registered with the exchange such as, for example, RESPORG IP addresses, and the predetermined floor and buy rates associated with each registered RESPORG. In order to determine whether the originating RESPORG 102 is enrolled with the toll-free exchange 302, the policy router 408 queries the database 410 to look up, on the stored ACL, the IP address associated with the originating RESPORG 102. In an example, the database 410 determines whether the originating RESPORG 102 is an identified IP address on the ACL. Determining whether the originating RESPORG 102 is enrolled with the toll-free exchange 302 also returns the floor rate set by the originating RESPORG 102. As described herein, the floor rate set by the originating RESPORG 102 indicates a minimum rate at which the originating RESPORG 102 will accept in order to route the text message through the toll-free exchange 302, wherein the minimum rate is paid by the terminating RESPORG 202.

If, in this example, the originating RESPORG 102 is not registered with the toll-free exchange 302, the database 410 will return a response (as indicated by arrow 4b) indicating the RESPORG is not enrolled with the toll-free exchange 302, or returns a null response. As such, the policy router 408 may signal to the originating switch 404 to reject the text message. The RESPORG 102 then may access the cellular network and the text message is routed using a traditional routing method. If, however, the originating RESPORG 102 is registered with the toll-free exchange 302, the database 410 returns a response (as indicated by arrow 4b) to the policy router 408 specifying that the originating RESPORG 202 is enrolled with the toll-free exchange 302 as well as the floor rate associated therewith. In some embodiments, the database 410 further returns the RESPORG ID associated with the enrolled originating RESPORG 102.

The policy router 408 (as indicated by arrow 5a), using the toll-free number to which the text message is directed, queries the SCP 412 for the RESPORG ID of the terminating RESPORG 202 that is associated with managing the toll-free number. As described herein, the toll-free exchange 302 uses the RESPORG ID of the terminating RESPORG 202 to route text messages to the toll-free subscriber. RESPORG IDs are assigned by and stored in a national database and accessible by the toll-free exchange 302 through the utilization of a Service Control Point (SCP) 412, or other methods. In this illustrative embodiment, the SCP 412 is a clone of the national database. In other words, the SCP 412 stores each RESPORG ID that is registered with the national database. In some embodiments, the SCP 412 updates its database daily, and in other embodiments the SCP 412 updates its database with RESPORG IDs on a lesser or more frequent basis. The SCP 412 may initiate a request, such as by a PUSH request, to the national database to receive RESPORG ID updates. Alternatively or additionally, the SCP 412 may receive updates, such as by a PULL request, from the national database to receive RESPORG ID updates.

Accordingly, the policy router 408 provides the SCP 412 with the toll-free number (as indicated by arrow 5a) to look up the RESPORG ID of the terminating RESPORG 202. The SCP 412 returns a response (as indicated by arrow 5b) to the policy router 408 providing the RESPORG ID of the terminating RESPORG 202.

Using the RESPORG ID of the terminating RESPORG 202, the policy router 408 queries the database 410 (as indicated by arrow 6a) to determine whether the terminating RESPORG 202 is registered with the toll-free exchange 302. If, in an example, the terminating RESPORG 202 is not registered with the toll-free exchange 302, the database 410 returns a response (as indicated by arrow 6b) indicating the terminating RESPORG 202 is not registered with the toll-free exchange 302, or a null response. As such, the policy router 408 signals the originating switch to reject the text message and the text message is routed over the cellular network using a traditional method. Alternatively, if the terminating RESPORG 202 is registered with the toll-free exchange 302, the database 410 returns a response (as indicated by arrow 6b) to the policy router 408 specifying the terminating RESPORG 202 is registered with the toll-free exchange 302, the IP address of the terminating RESPORG 202, and the predetermined buy rate, and any additional information relating to the terminating RESPORG 202. Depending on the embodiment, any additional information needed by the exchange to route the text message may also be stored on the database 410 and sent to the policy router 408.

Although the above-described embodiments describe example scenarios in which a text message is routed based on both the originating RESPORG 102 and terminating RESPORG 202 being enrolled with the toll-free exchange 302, registration of the terminating RESPORG 202 is not necessary for the registered originating RESPORG 102 to route a text message. Although text messages are originated by a registered/enrolled RESPORG 102, text messages may still be routed even though the terminating RESPORG 202 is not registered/enrolled with the toll-free exchange 302. If the terminating RESPORG 202 is not registered/enrolled, the toll-free exchange 302 may route the text message instead of returning the text message to the originating RESPORG 102 or requiring the text message to be routed through traditional methods. This decision, which is made by the policy router 408, is based on a pre-defined set of criteria configured by the registered originating RESPORG 102. In other words, the originating RESPORG 102 may specify whether it prefers to route a text message through the toll-free exchange 302 regardless if the terminating RESPORG is registered with the toll-free exchange 302. Such an indication may be included in the meta information, stored in a header of the text message.

As indicated by arrow 7, the policy router 408 informs the originating switch 404 to attach the IP address of the terminating RESPORG 202, and any additional information, if necessary, to a header of the signaling packet for the text message, which is passed to the media gateway server farm 414. In example embodiments, the originating switch 404 attaches a Session Initiation Protocol (SIP) header including the IP address of the terminating RESPORG 202.

As described herein, the media gateway server farm 414 processes the media portion of the text message, such as the voice, video, or any media data. In some embodiments, the media gateway server farm 414 processes the media such as compressing and configuring the media to be carried over a network to the terminating RESPORG 202.

In some embodiments, the media gateway server farm 414 also provides load balancing in order to process voice data. Text messages typically occur more frequently during the day and gradually decrease during evening and early morning hours. Accordingly, the media gateway server farm 414 provides the necessary load balancing to distribute voice and video processing over one or more servers based on the time of day and text message traffic experienced by the media gateway server farm 414. The media gateway server farm 414 will expand or contract in size automatically to provide sufficient computing resources to adapt to text message volume.

In some embodiments, the media gateway server farm 414 includes a plurality of computing devices such as one or more servers, wherein the servers may be located in a single geographical area and in other embodiments, the servers may be located across several remote sites. In an embodiment, some or all the media gateway server farm 414 may be leased on-demand from a third-party server provider, such as Amazon or Google, and implemented as a 'cloud service.'

As described herein, once the identity of the terminating RESPORG 202 is determined, the originating switch 404 provides text message signaling to the terminating switch 406 (as indicated by arrow 7). The processed media data is also provided to the terminating RESPORG 202 directly by the media gateway server farm 414. The terminating switch 406 reads the IP address included in the header of the media data packet and forwards the data packet to the identified terminating RESPORG 202 (as indicated by arrow 8). Finally, the terminating RESPORG 202 terminates the text message to the toll-free subscriber (as indicated by arrow 9).

As described herein, the toll-free exchange 302 monitors each text message sent through the toll-free exchange 302 and provides administrative and accounting services to the registered RESPORGs. As such, the toll-free exchange 302 includes a thrasher 416 that monitors each text message and provides a text message detail record. In particular, the text message detail record includes, for example, the parties involved, the buy rate of the terminating RESPORG 202, and the resulting cost associated with the text message, to be paid by the terminating RESPORG 202 to the toll-free exchange 302 and in part to the originating RESPORG 102. In some embodiments, the thrasher saves the text message records in a database 418. In embodiments, the database 418 is a cloud-based database, and in other embodiments, the database is hosted within the toll-free exchange 302. In an example, the database 418 is accessible by each registered RESPORG, which allows each RESPORG to view its text message records. In some embodiments, the database 418 further provides each RESPORG with analytical data as well as data identifying each RESPORG participating on the toll-free exchange 302. Accordingly, a novel configuration of the present disclosure provides routing of text messages to toll-free subscribers based on the RESORG ID of the RESORG associated with the toll-free number to which the text message is directed.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims. For example, rather using a general purpose processor with an operating system executing software programs, one of skill in the art will recognize that some or all of the functionality described above could be equally implemented on a purpose-built piece of hardware, in embedded systems in which the logic is stored on read only memory as firmware, or as an integrated circuit.

What is claimed is:

1. A method for routing a call directed to a toll-free number to be routed over a public switched telephone network (PSTN), comprising:
   receiving a request associated with the call having an indication of the toll-free number;
   identifying an entry in a database that associates the toll-free number with a network address; and
   in response to the received request, generating a response having the network address associated with the toll-free number to route the call via a network different from the PSTN.

2. The method of claim 1, further comprising:
   receiving a second request associated with a second call directed to a second toll-free number;
   determining that the database does not have an entry for the second toll-free number; and
   generating a response to the second request indicating that the second toll-free number is not registered.

3. The method of claim 1, further comprising:
   generating a routing path for the toll-free number based at least in part on the network address.

4. The method of claim 1, further comprising:
   receiving, via an enrollment website, enrollment information for the toll-free number that indicates the network address; and
   generating the entry in the database that associates the toll-free number with the network address.

5. The method of claim 4, wherein the enrollment information further comprises an indication of a responsible organization (RESORG) associated with the toll-free number.

6. The method of claim 5, wherein the entry in the database further comprises the indication of the RESORG.

7. The method of claim 1, wherein the entry in the database further comprises payment information for the RESORG.

8. The method of claim 1, wherein generating the response comprises generating an IP address, the IP address comprising the network address and a host address.

9. A method for routing a call directed to a toll-free number to be routed over a public switched telephone network (PSTN), comprising:
   receiving, via an enrollment website, enrollment information for a toll-free number that indicates a network address;
   generating an entry in the database that associates the toll-free number with the network address;
   receiving a request associated with the call having an indication of the toll-free number;
   identifying the entry in a database that associates the toll-free number with the network address; and
   in response to the received request, generating a response having the network address associated with the toll-free number to route the call via a network different from the PSTN.

10. The method of claim 9, further comprising:
    receiving a second request associated with a second call directed to a second toll-free number;
    determining that the database does not have an entry for the second toll-free number; and
    generating a response to the second request indicating that the second toll-free number is not registered.

11. The method of claim 9, further comprising:
    generating a routing path for the toll-free number based at least in part on the network address.

12. The method of claim 9, wherein the enrollment information further comprises an indication of a responsible organization (RESORG) associated with the toll-free number.

13. The method of claim 12, wherein the entry in the database further comprises the indication of the RESORG.

14. The method of claim 9, wherein the entry in the database further comprises payment information for the RESORG.

15. The method of claim 9, wherein generating the response comprises generating an IP address, the IP address comprising the network address and a host address.

16. A system comprising:
    at least one processor; and
    memory, operatively connected to the at least one processor and storing instructions that, when executed by the at least one processor, cause the system to perform a set of operations, the set of operations comprising:
      receiving a request associated with the call having an indication of the toll-free number;
      identifying an entry in a database that associates the toll-free number with a network address; and
      in response to the received request, generating a response having the network address associated with the toll-free number to route the call via a network different from the PSTN.

17. The system of claim 16, wherein the set of operations further comprises:
    receiving a second request associated with a second call directed to a second toll-free number;
    determining that the database does not have an entry for the second toll-free number; and
    generating a response to the second request indicating that the second toll-free number is not registered.

18. The system of claim 16, wherein the set of operations further comprises:
    generating a routing path for the toll-free number based at least in part on the network address.

19. The system of claim 16, wherein the set of operations further comprises:
    receiving, via an enrollment website, enrollment information for the toll-free number that indicates the network address; and
    generating the entry in the database that associates the toll-free number with the network address.

20. The system of claim 19, wherein the enrollment information further comprises an indication of a responsible organization (RESORG) associated with the toll-free number.

21. The system of claim 20, wherein the entry in the database further comprises the indication of the RESORG.

22. The system of claim 16, wherein the entry in the database further comprises payment information for the RESPORG.

23. The system of claim 16, wherein the set of operations comprises generating the response by generating an IP address, the IP address comprising the network address and a host address.

* * * * *